United States Patent
Lannestedt et al.

(10) Patent No.: US 7,312,822 B2
(45) Date of Patent: Dec. 25, 2007

(54) ATTACHMENT OF ADDITIONAL INFORMATION TO STORED OR STREAMED IMAGE

(75) Inventors: Tomas Lannestedt, Alvsjo (SE); Mats Henriksson, Taby (SE)

(73) Assignee: FLIR Systems AB, Danderyd (SE)

( * ) Notice: Subject to any disclaimer, the term of this patent is extended or adjusted under 35 U.S.C. 154(b) by 810 days.

(21) Appl. No.: 10/475,119

(22) PCT Filed: May 3, 2002

(86) PCT No.: PCT/SE02/00857

§ 371 (c)(1),
(2), (4) Date: Oct. 17, 2003

(87) PCT Pub. No.: WO02/091741

PCT Pub. Date: Nov. 14, 2002

(65) Prior Publication Data

US 2005/0156108 A1 Jul. 21, 2005

(30) Foreign Application Priority Data

May 7, 2001 (SE) .................................. 0101577

(51) Int. Cl.
*H04N 5/76* (2006.01)
*H01L 25/00* (2006.01)
*G01J 5/02* (2006.01)

(52) U.S. Cl. ............... 348/231.6; 250/332; 250/339.02

(58) Field of Classification Search ........... 348/231.99, 348/231.2, 231.3, 231.6, 222.1; 250/339.01, 250/339.02, 339.05, 330, 331

See application file for complete search history.

(56) References Cited

U.S. PATENT DOCUMENTS 5,247,369 A 9/1993 Yano et al.

(Continued)

FOREIGN PATENT DOCUMENTS

EP 0 528 642 2/1993

OTHER PUBLICATIONS

ISO/IEC JTC 1/SC 29/WG 1 N1803. Date Jul. 2000. ISO/IEC JTC 1/SC 29/WG 1 (ITU-T SG8) Coding of Still Pictures. Title: JPEG2000requirements and profiles version 6.3. Source: Requirements ad hoc group. Project: JPEG2000. Status: Draft in progress. Distribution: WG1 Arles Meeting, WG1 Web pages.p. 39.

(Continued)

*Primary Examiner*—John M. Villecco
(74) *Attorney, Agent, or Firm*—Young & Thompson

(57) ABSTRACT

A method for storing or streaming images, wherein the images can be further processed after the storing or during the streaming includes the steps of choosing a span of the initially captured data, this span being adapted to be shown as an image to a user storing or streaming this chosen span of the data as an image in a file format or onto a stream to which additional information can be attached and which file format or steam could be processed by at least one standard application storing or streaming all or a part of the initially captured data as additional information to this file format or stream, and storing or streaming parameters needed for the processing of the image as further additional information to the file or stream.

24 Claims, 1 Drawing Sheet

U.S. PATENT DOCUMENTS

| | | | | |
|---|---|---|---|---|
| 5,349,348 | A | * | 9/1994 | Anderson et al. ............. 341/51 |
| 5,386,117 | A | * | 1/1995 | Piety et al. ................. 250/330 |
| 5,528,293 | A | | 6/1996 | Watanabe |
| 5,637,871 | A | * | 6/1997 | Piety et al. ................. 250/330 |
| 5,991,816 | A | * | 11/1999 | Percival et al. ............. 709/247 |
| 6,417,797 | B1 | * | 7/2002 | Cousins et al. ............. 342/179 |
| 7,154,093 | B2 | * | 12/2006 | Lannestedt .................. 250/330 |
| 2001/0045463 | A1 | * | 11/2001 | Madding et al. ....... 235/462.14 |
| 2001/0046367 | A1 | * | 11/2001 | Shimizu ...................... 386/46 |
| 2003/0214583 | A1 | * | 11/2003 | Sadok ........................ 348/143 |

OTHER PUBLICATIONS

Hamilton, Eric; JPEG File Interchange format. Version 1.02, Sep. 1, 1992. C-Cube Microsystems. [online] [Retrieved on Jan. 14, 2002] retrieved from the Internet: <http://www.w3.org/Graphics/JPEG/. p. 1-7.

* cited by examiner

ATTACHMENT OF ADDITIONAL INFORMATION TO STORED OR STREAMED IMAGE

The present invention relates to a method for storing or streaming images, wherein the images can be further processed after the storing or during the streaming.

The invention further relates to a system for capturing and storing and/or streaming images, wherein the images can be further processed after the storing or during the streaming, comprising
- a detector adapted to capture data;
- a video processor connected to the detector, the video processor being adapted to process the captured data;
- a CPU connected to the video processor, the CPU being adapted to provide the video processor with parameters for the processing;
- a file processor and/or a stream processor connected to the video processor and the CPU.

BACKGROUND OF THE INVENTION

It is for example of great interest to be able to process images taken by infrared cameras (IR-cameras). IR-cameras are used for capturing images showing the temperature variance for different objects in a view. Such thermal images are for example used when searching for defects in devices since defect parts of devices are often heated before they break.

An IR-camera typically captures information of temperatures from about —60 degrees Celsius to about 2000 degrees Celsius. This range is called the thermal camera dynamic range. Typically a thermal image will show the background ambient temperature and some hot or cold objects that will be subject for inspection. Background ambient will vary from outdoor winter temperature to a hot summer day temperature. The inspected object (a thermal anomaly) differ from the background as a hot or cold object within or outside the typical background range. Thus a thermal image will comprise a much smaller range than the thermal camera dynamic range. An image could be prepared from only this interesting temperature span and then be delivered to for example a customer. This is today a common way to handle temperature images. Thus the images taken by infrared cameras are processed by the image provider and then transferred to customers as a view where only a part of the initially captured data is shown. A problem with this is that this view cannot be processed by the customers any further. The customer may have a different opinion than the provider of the image about what is the interesting part of the view. Furthermore, if the temperature span for visualising the background is chosen to be for example 20-40 degrees Celsius, extreme events, such as a hotspot (a thermal anomaly like an overheated electric conductor) or an explosion, will saturate in the image thermal range and not be shown in the image.

Another approach today is to provide all the initially captured data to the customer. A problem with this method is that the customer not is able to see the image at all before he has processed it and to process the initially captured data the customer needs to have dedicated software.

SUMMARY

An object of the invention is to improve the storing and/or streaming and distribution of images to customers wherein the images can be further processed by the customer after the storing or during the streaming.

A further object of the present invention is to provide a method and a system for storing and distributing these images such that the user is able to view the image without needing any dedicated software and such that the user at the same time has access to the initially captured data such that he can choose which data that is interesting for him and process the image by using dedicated software.

These objects are achieved in a method as initially described where the method comprises the steps of:
- choosing a span of the initially captured data, this span being adapted to be shown as an image to a user;
- storing or streaming this chosen span of the data as an image in a file format or onto a stream to which additional information can be attached and which file format or stream could be processed by at least one standard application;
- storing or streaming all or a part of the initially captured data as additional information to this file format or stream;
- storing or streaming parameters needed for the processing of the image as further additional information to the file or stream.

The objects are also achieved in a system as initially described wherein the file processor and the stream processor comprises:
- receiving means adapted to receive data from the video processor and instructions and parameters from the CPU;
- first storing means and first streaming means respectively, both connected to the receiving means and adapted to store and stream respectively one portion of the data received from the video processor as an image in a file format and onto a stream respectively to which additional information can be attached and which file format and stream can be processed by at least one standard application, the storing and streaming of one portion of the received data being performed according to the instructions received from the CPU;
- second storing means and second streaming means respectively, both connected to the receiving means and adapted to store and stream all or a part of the data received from the video processor as additional information to the file and the stream respectively, the storing and streaming being performed according to the received instructions or according to pre-set definitions;
- third storing means and third streaming means respectively, both connected to the receiving means and adapted to store and stream respectively parameters needed for the processing of the image as further additional information to the file and the stream respectively, the parameters being provided to the third storing and streaming means through the receiving means from the CPU.

Hereby a method and a system are provided by which a receiver of the data is able to both view an image without using any special software and to post-process the image according to his own desires. The receiver has access to all or at least to the interesting part of the initially captured data. The receiver also has access to all the parameters necessary for the processing of the image.

The initial data could be captured by a camera. The camera could be an infrared camera and the image is thus an image containing information about temperatures.

Preferably the used file format is chosen among the following formats JPEG, PNG, TIFF, MJPEG and DV.

Suitably the storing or streaming of all or a part of the initially captured data as additional information to the file format or stream is performed in a 16 bits format. Hereby a good resolution is obtained.

In one embodiment of the invention only the initially captured data not being chosen for the image is stored or streamed as additional information to the file format or stream. Hereby memory is saved since no data needs to be stored or streamed twice.

Suitably the initially captured data is sub-sampled before storing or streaming it as additional information to the file format or stream. Hereby memory is saved.

Preferably an initial image is captured over a span of about −60 to 2000 degrees Celsius.

Suitably the storing or streaming of parameters as additional information comprises storing or streaming one or more of the following: the calibration constants for the camera, the compensation for the background, the conditions for the detector, maximal and minimum temperatures, information about the color scales and measurement and set-up parameters. Hereby the post-processing of the image is possible.

Advantageously the users are provided with the software needed for the processing of the additional data.

In one embodiment of the invention the method comprises capturing images following each other, making up a movie and storing these images in a row of file formats as described above.

Preferably the stream processor is adapted to perform compression according to DV or MJPEG.

Suitably the file processor is adapted to store the file comprising the image, the additional data and the parameters in a non volatile or a volatile memory.

DETAILED DESCRIPTION OF EMBODIMENTS

Figure 1:
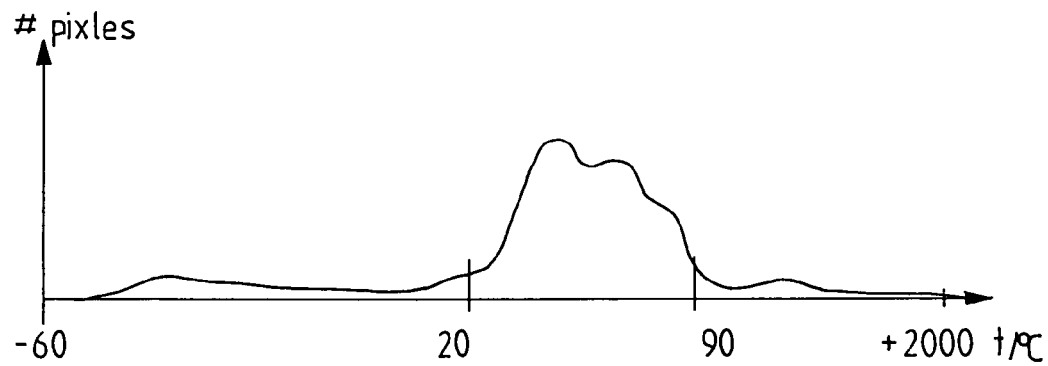
FIG. 1 shows a histogram of an ordinary image captured by an infrared camera.

FIG. 1 shows a histogram of an ordinary image captured by an infrared camera (IR camera). The total temperature span for a common IR-camera ranges from about −60 to 2000 degrees Celsius. As can be seen in FIG. 1 only a small span of the temperature interval is interesting. This is the normal case. For example in this case, the marked span between 20 and 90 degrees Celsius would be the most interesting part. Thus a common way to present these images is to cut out the interesting span, compress and store this span of the image in some kind of file format. However, if the span between 20 and 90 degrees Celsius is chosen, the possibility to see extreme events, such as an explosion, is lost. On the other hand the human eye would not perceive a viewable image if the whole span of the camera between −60 and 2000 degrees Celsius were used for the image. Furthermore, different spans could be interesting for different purposes. Thus a possibility to post-process the image would be of interest for many users.

As described above another approach is to provide all the initially captured data to the users. However, special software is then needed to be able to see and process the image.

According to the present invention an image that is most interesting according to the provider of the image is compressed and stored according to common standards in a file format to which additional information could be attached. Alternatively the image is streamed onto a stream to which additional information can be attached. This "most interesting" image can then be presented by standard applications and all users can see this image without any special software and without processing the image.

Figure 2:
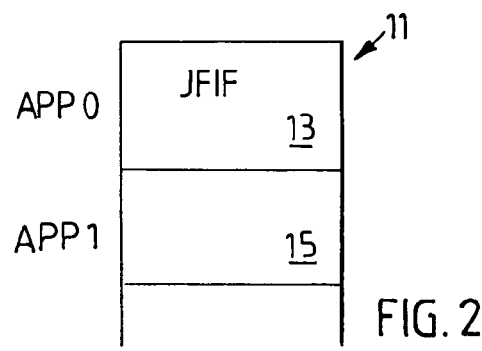
FIG. 2 shows a file format to which additional information can be attached.

FIG. 2 shows a file format 11 to which additional information can be attached. In the embodiment of the invention shown in FIG. 2 the file format is JPEG (Joint Photographic Expert Group). PNG (Portable Network Graphics) or TIFF (Tagged Image File Format) are examples of other possible formats. Other similar formats are of course also possible. In the embodiment shown in FIG. 2 the "most interesting" image is stored in a first part of the JPEG file called APP0 13. In this embodiment the image is stored according to JEIF (JPEG File Interchangeable Format). According to the invention some or all of the initially captured data are stored in a tag to the file, in this case called APP1 15. APP stands for application and indicates that different applications can place information in different tags to the file. The name of the information provider is indicated in the beginning of each tag. If a destructive compression such as JPEG is used all of the initially captured data is preferably attached to the image in the APP1 tag 15. The reason is that the JFIF image is slightly destroyed in the compression and won't be able to be used for processing. If on the other hand, a non-destructive or lossless compression, such as PNG is used, it would be enough to attach the rest of the initially captured data in a tag to the PNG file. Other types of discriminations to the initially captured data also are possible. For example, different temperature spans could be of interest for different users and different purposes.

Furthermore some radiometry parameters have to be attached. This is in the embodiment shown in FIG. 2 accomplished by adding additional sub-tags to the APP1 main tag 15. In the JPEG format up to 15 main tags could be provided. Furthermore each tag can be provided with additional sub-tags. In this embodiment the radiometry parameters are placed in a sub-tag to the APP1 tag 15. The parameters are needed for the processing of the image and comprise, for example, measurement and set-up parameters. It could be the settings of the camera at the time for the capturing of data, the conditions for the detector, the calibration constants for the camera, color scale information, measuring points and maximal and minimum temperatures. Further examples of additional information that can be added to the image are textual comments, for example about what can be seen on the image, other kinds of textual information and sound information, for example comments from the photographer. Furthermore the distance from the camera to the measurement object, the positions of objects in the image, such as co-ordinates from a GPS, and information about the customer and the customer's applications could be added to the file. In the embodiment shown in FIG. 2 both the initially captured data and all the parameters are attached in the APP1 tag 15. All necessary parameters from the camera and the object(s) could of course be attached to the image.

When the user wants to see the thermal image he opens the JPEG file. The JFIF image is shown to the user since this image can be shown by standard applications. No special software is needed to show this image. To be able to process the image however, the user needs to use the additional data attached to the JPEG file in the APP1 tag 15. To process this data special software is needed. This software could be provided from the camera provider to the user. Alternatively such software could be provided as scripts or applets on a homepage. The user can then install the software from the homepage. The software could be a new application that allows processing of the image data or it could be a software enabling already existing applications to process the image data. During the processing of the image the parameters that were attached to the JPEG image in the sub-tag to the APP1 tag 15 are used for calculations.

This method of storing the "most interesting" image together with all the initially captured data and together with the parameters necessary for calculations and processing makes it possible for the users to process the image and all users have access to all the initially captured data. Furthermore the user can view the "most interesting" image without any special software.

The initially captured data stored as additional information in the APP1 tag 15 is in one embodiment stored in a 16-bits format. 16-bit resolution is needed to resolute a thermal image in the mKelvin range. Using an 8-bits format is also possible but the resolution will of course be worse. Furthermore this additionally stored data could be compressed according to known art. The compression should however not be a destructive compression since the data should be further processed by the user. It is also possible to sub-sample, i.e. only store every second pixel of the image, to save memory. Sub-sampling will of course reduce spatial resolution. However, this reduction can be acceptable as long as the amount of low-pass filtering is less than the thermal spatial resolution.

The method according to the invention could also be applied for moving images. The images are simply stored, or actually streamed, in files as described above where the files are following each other in a stream like the DV (Digital Video) stream format and/or file formats made for motion like the non-standard M-JPEG/MJPEG/MJPG. A way of adding thermal information to a DV stream, normally used in digital Camcorders, could be to add the information to the existing sound channel. Intelligent compressing or data reduction needs to be applied according to what have been mentioned above.

There are some possible variants within the scope of this invention concerning the storing or streaming of the initially captured data. As already mentioned all the initially captured data does not have to be attached to the file. It is also possible that the provider of the image processes the image, for example for compensating for technical conditions during the capturing of the image and for technical conditions of the camera, in a first step. Then the user/customer can process the image in a second step according to his own interests.

Figure 3:
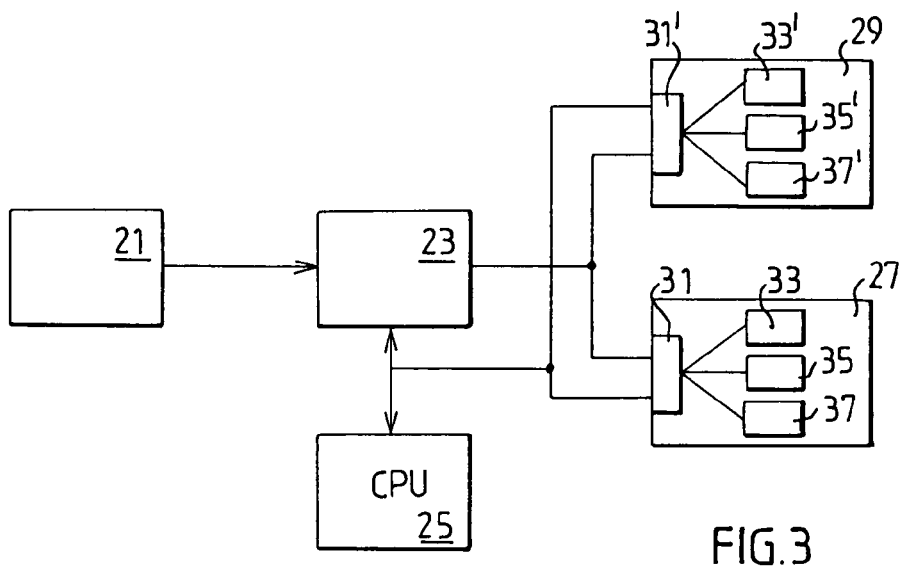
FIG. 3 is a schematic view of a system according to the invention.

FIG. 3 is a schematic view of a system according to the invention. The system is here an IR camera. It comprises a detector 21 adapted to capture data. The data is in this case thermal data about the objects seen by the camera. Furthermore the camera comprises a video processor 23 connected to the detector 21. The video processor 23 is adapted to process the captured data. The processing comprises for example filtering of the captured data and focusing of the image. The processing could also comprise the discrimination of the captured data to achieve an image viewable by the human eye. Instructions about what kind of discrimination that is desired is provided to the video processor 23 from a CPU 25 connected to the video processor 23. Other parameters needed for the processing could also be provided from the CPU 25. The provider of the data could thus change the instructions and parameters regarding different possibilities of processing the captured data through the CPU 25.

The camera comprises further a file processor 27 and/or a stream processor 29 connected to the video processor 23 and the CPU 25. The file processor 27 and the stream processor 29 comprises according to the invention receiving means 31,31' adapted to receive the processed data from the video processor 23 and instructions and parameters from the CPU 25. The processed data received from the video processor 23 could be all the initially captured data. Alternatively the data could have been sub-sampled in the video processor 23 or some parts of the data could have been sorted out. Furthermore it is possible that the discrimination of the initially captured data to a visual image is done in the video processor 23. In this case both this image and all or a part of the initially captured data is transferred to the file processor and/or to the stream processor. The discrimination process to create a visual image is in another embodiment of the invention performed in the file processor and the stream processor respectively. Instructions about the discrimination are provided to the video processor 23 or the file processor and the stream processor respectively from the CPU 25. The other mentioned instructions from the CPU 25 could be instructions about how to treat and store the received data and the parameters. The parameters are parameters needed for the post-processing of the thermal data. Examples of such parameters are given in connection to FIG. 2.

The file processor comprise further according to the invention first storing means 33, second storing means 35 and third storing means 37 all connected to the receiving means 33. In the same way the stream processor comprise first streaming means 33', second streaming means 35' and third streaming means 37' all connected to the receiving means 31'. The first storing and streaming means 33,33' are adapted to store and stream respectively one portion of the data received from the video processor 23 in a file format 11 (FIG. 2) or onto a stream respectively to which additional information can be attached and which file format 11 and stream can be processed by at least one standard application. This portion should be stored (or streamed) as an image and in one embodiment it is stored in a JPEG file format. As described above other formats are also possible. Which portion of the received data that should be stored (or streamed) as an image is given by the instructions received from the CPU 25.

The second storing and streaming means 35,35' are adapted to store and stream respectively all or a part of the received data as discussed above as additional information to the file 11 or the stream, the storing and streaming being performed according to the instructions received from the CPU or according to pre-set definitions. The second storing and streaming means 35,35' could thus be provided with fixed instructions about how to store and stream the data. Otherwise the instructions are provided from the CPU 25.

The third storing and streaming means 37,37' are adapted to store and stream respectively parameters needed for the processing of the image as further additional information to the file 11 or the stream. The parameters are provided to the third storing and streaming means 37,37' through the receiving means 31,31' from the CPU 25. Examples of the parameters are given in the description of FIG. 2 above.

The stream processor 29 is adapted to perform compression according to for example DV, MJPEG or broadcast or point to point videoconferencing systems such as H323. The file processor 27 is adapted to store the file 11 with the image, the additional data and the parameters in a non volatile or a volatile memory. Some examples are PCMCIA (Personal Computer Memory Card International Association) and a hard-drive or a flash file system in the camera.

The embodiments described above are all concerning temperature images taken by an IR-camera. The invention could however also be applied for other techniques. Ultrasound analyses and vibration analyses are two examples where data is captured and presented to the user as an image and thus two examples of techniques where the present invention could be applied.

The invention claimed is:

1. A method for storing or streaming IR images, wherein the images can be further processed after the storing or during the streaming, the method comprising the steps of:
choosing a first span of the initially captured IR image data corresponding to a first temperature range, the first span being adapted to be shown as an image to a user;
storing or streaming the first span of the data as an image in a file format or onto a stream to which additional information can be attached, wherein the file format or stream is processable by at least one standard application;
storing or streaming a second span of the initially captured data different from the first span as additional information to the file format or stream;
storing or streaming parameters needed for the processing of the image as further additional information to the file format or stream; and
post-processing the image by a user receiving said data and selectively using the additional information, the further additional information and dedicated software.

2. The method according to claim 1, further comprising capturing the initial data by a camera.

3. The method according to claim 2, wherein the capturing is performed by an infrared camera and the image being an image containing information about temperatures.

4. The method according to claim 1, wherein the used file format is chosen among the following formats JPEG, PNG, TIFF, MJPEG and DV.

5. The method according to claim 1, wherein the storing or streaming of the second span of the initially captured data as additional information to the file format or stream is performed in a 16 bits format.

6. The method according to claim 1, further comprising storing or streaming only the initially captured data not being chosen for the image as additional information to the file format or stream.

7. The method according to claim 1, further comprising sub-sampling of the initially captured data before storing or streaming it as additional information to the file format or stream.

8. The method according to claim 1, further comprising capturing an initial image over a span of about −60 to 2000 degrees Celsius.

9. The method according to claim 1, wherein the storing or streaming of parameters as additional information comprises storing or streaming one or more of the following: the calibration constants for the camera, the compensation for the background, the conditions for the detector, maximal and minimum temperatures, information about the colour scales and measurement and set-up parameters.

10. The method according to claim 1, further comprising providing the users with the software needed for the processing of the additional data.

11. The method according to claim 1, further comprising capturing images following each other, making up a movie and storing these images in a row of file formats.

12. The method of claim 1, wherein the second span corresponds to a second temperature range different from the first temperature range.

13. A system for capturing and storing and/or streaming IR images, wherein the images can be further processed after the storing or during the streaming, comprising:
a detector (21) adapted to capture IR image data;
a video processor (23) connected to the detector (21), the video processor (23) being adapted to process the captured data;
a CPU (25) connected to the video processor (23), the CPU (25) being adapted to provide the video processor (23) with parameters for the processing;
at least one of a file and a stream processor connected to the video processor (23) and the CPU (25);
wherein the at least one processor comprises:
receiving means (31, 31') for receiving data from the video processor (23) and instructions and parameters from the CPU (25);
first means (33,33') connected to the receiving means (31, 31') for storing or streaming one portion of the data corresponding to a first temperature range and received from the video processor (23) as an image in a file format (11) or onto a stream, respectively, to which additional information can be attached, wherein the file format (11) or stream can be processed by at least one standard application, the storing or streaming of the one portion of the received data being performed according to the instructions received from the CPU (25);
second means (35, 35') connected to the receiving means (31,31') for storing or streaming a second portion of the data different from the one portion and received from the video processor (23) as additional information to the file or the stream respectively, the storing or streaming being performed according to the received instructions or according to pre-set definitions;
third means (37,37') connected to the receiving means (31, 31') for storing or streaming parameters needed for the processing of the image as further additional information to the file (11) or the stream respectively, the parameters being provided to the third means (37, 37') through the receiving means (31, 31') from the CPU (25),
said CPU (25) being arranged to enable post-processing of the image by a user receiving said data, selectively using the additional information, the further additional information and dedicated software.

14. The system according to claim 13, wherein it is a camera.

15. The system according to claim 14, wherein the system is an infrared camera and the detector (21) is adapted to capture thermal data.

16. The system according to claim 13, wherein each of said first, second, and third means (33,33', 35,35', 37,37') is adapted to store or stream the data and parameters in JPEG, PNG, TIFF, MJPEG or DV.

17. The system according to claim 13, wherein the second means (35,35') are adapted to store the data in a 16 bits format.

18. The system according to claim 13, wherein the second means (35, 35') are adapted to store or stream only the data not having been stored or streamed by the first means (33,33').

19. The system according to claim 13, wherein the second means (35, 35') are adapted to sub-sampling the data before storing or streaming it.

20. The system according to claim 13, wherein said at least one processor is adapted to perform compression according to DV or MJPEG.

21. The system according to claim 13, wherein the file processor (27) is adapted to store the file comprising the image, the additional data and the parameters in a non volatile or a volatile memory.

22. The system of claim 13, wherein the second portion corresponds to a second temperature range different from the first temperature range.

23. A method for processing IR images, comprising the steps of:

choosing a first span of initially captured IR image data corresponding to a first temperature range;

choosing a second span of the initially captured IR image data corresponding to a second temperature range different from the first temperature range;

attaching data corresponding to the second span to data corresponding to the first span;

attaching to the data corresponding to the second span parameters for viewing a second image corresponding to the second span; and displaying a first image corresponding to the first span and the second image corresponding to the second span.

24. The method of claim 23, wherein the first image is displayed without reference to the parameters and the second image is displayed with reference to the parameters.

* * * * *